May 29, 1956 — W. D. CURTIS — 2,747,740
VACUUM TYPE COFFEE STRAINER
Filed Jan. 29, 1953
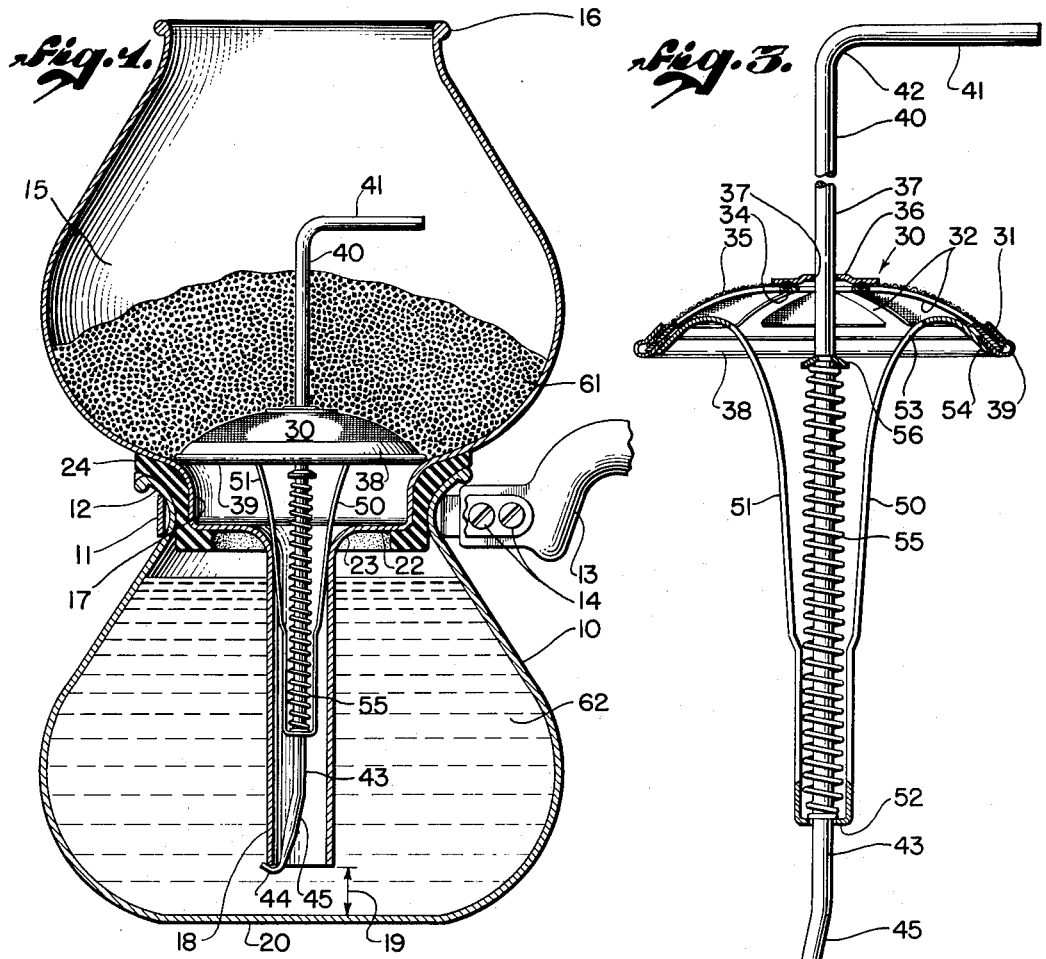
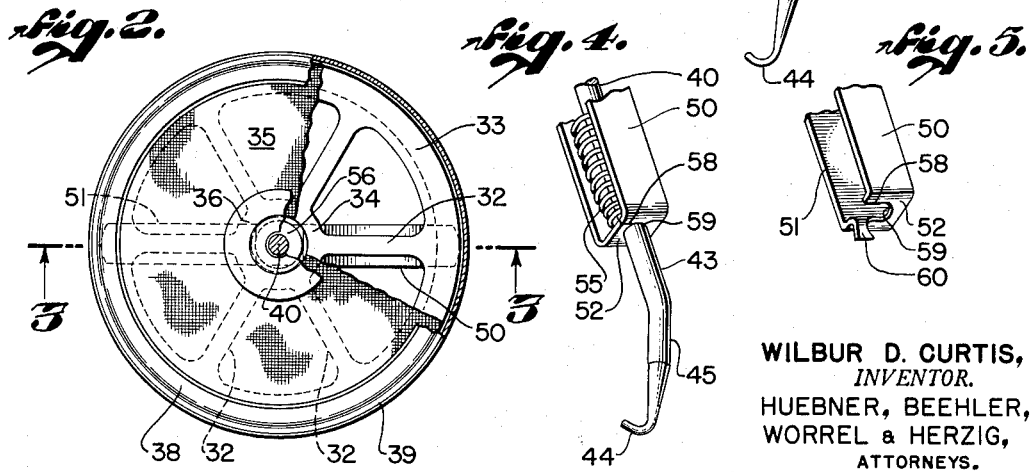
WILBUR D. CURTIS,
INVENTOR.
HUEBNER, BEEHLER,
WORREL & HERZIG,
ATTORNEYS.
BY Vernon D. Beehler though a number of innovations have been placed before the public, they have invariably failed in some important respect such as either permitting too great a quantity of sediment from the coffee grounds to pass to the lower bowl or have had such appurtenances added to the strainer as to considerably affect the sanitary aspects. Further inasmuch as the strainer or filter is handled with great frequency, it is prone to become broken or to get out of order and the attempts to improve the strainer or filter have not taken sufficiently into consideration the necessity for replacement.

United States Patent Office 2,747,740
Patented May 29, 1956

2,747,740

VACUUM TYPE COFFEE STRAINER

Wilbur D. Curtis, Los Angeles, Calif., assignor to Wilbur Curtis Company, Inc., Los Angeles, Calif., a corporation of California Application January 29, 1953, Serial No. 334,046

5 Claims. (Cl. 210—162)

The invention relates to the art of coffee making and has particular reference to the so-called vacuum type coffee makers which feature a lower bowl in which water is initially placed, an upper bowl fitting tightly over the lower bowl adapted to contain coffee and to receive water boiling up from the lower bowl, and a strainer or filter between the upper bowl and the lower bowl which prevents the coffee grounds from being sucked into the lower bowl after the water has steeped the coffee.

A considerable number of patents have heretofore been directed to one accessory or another devoted to improving the brewing of coffee in vacuum type coffee makers. Some of these accessories and in fact most of them have been directed to improving the strainer or filter in some fashion or other. Although a number of innovations have been placed before the public, they have invariably failed in some important respect such as either permitting too great a quantity of sediment from the coffee grounds to pass to the lower bowl or have had such appurtenances added to the strainer as to considerably affect the sanitary aspects. Further inasmuch as the strainer or filter is handled with great frequency, it is prone to become broken or to get out of order and the attempts to improve the strainer or filter have not taken sufficiently into consideration the necessity for replacement.

It is therefore among the objects of the invention to provide a new and improved strainer or filter for a vacuum type coffee maker which is particularly sanitary in its make-up in that it avoids the inclusion of such construction as will permit the accumulation of sediment and oils of the coffee.

Another object of the invention is to provide a new and improved strainer or filter for vacuum type coffee makers which is particularly inexpensive to manufacture and which is also constructed in a manner permitting the strainer to be separated one part from another so that the part most prone to become worn out or damaged can be separately removed and replaced without it being necessary to replace the entire strainer.

Still another object of the invention is to provide a new and improved considerably simplified strainer, portions of which necessary to the support of the spring are also employed to accurately center the strainer in the neck of the upper bowl.

Also included among the objects of the invention is to provide a new and improved strainer of such construction that it greatly improves the evenness of passage therethrough of coffee after remaining in contact with the coffee grounds, the strainer effect being one capable of making the timing of the brew more accurate thereby to improve the uniformity of coffee made by use of the invention.

With these and other objects in view, the invention consists in the construction, arrangement and combination of the various parts of the device whereby the objects contemplated are attained, as hereinafter set forth, pointed out in the appended claims and illustrated in the accompanying drawings.

This is a continuation-in-part of application Serial No. 95,606, filed May 27, 1949, now abandoned.

In the drawings:

Figure 1 is a vertical sectional view of a vacuum type coffee maker including the strainer or filter forming the subject matter of the invention.

Figure 2 is a top view of the strainer itself.

Figure 3 is a vertical sectional view taken through the strainer on the line 3—3 of Figure 2.

Figure 4 is a fragmentary view of the bottom portion of the strainer in assembled condition.

Figure 5 is a perspective view of the bottom of the spider of the strainer showing it broken open to permit removal of portions of the strainer one from another.

The vacuum type coffee maker illustrated in Figure 1 features essentially a lower bowl 10 having a collar 11 surrounding a neck 12 thereof to which is attached a handle 13 by means of screws 14. Above the lower bowl is an upper bowl 15 having an upper relatively wide rim 16 and having a well 17 at the lower end. At the center of the well and extending downwardly therefrom is a neck 18 having such length that when the upper bowl is positioned in the lower bowl there will remain a space 19 between the lower end of the neck and a bottom 20 of the lower bowl of about the proportion indicated in Figure 1. The neck 18 is centrally disposed within a bottom 22 of the well 17, there being in the modification shown a funnel-like portion 23 where the neck joins the bottom of the well. A rubber-like washer 24 forms a seal between the exterior of the well 17 and the interior of the neck 12 of the lower bowl 10.

A strainer indicated generally by the reference character 30 is shown in detail in Figures 2 and 3 and in Figure 1 is shown in the position it normally occupies in the upper bowl of a vacuum type coffee maker. The strainer or filter, if that term be used, consists in part of a somewhat dome-shaped frame 31 which has a series of spokes 32 curved upwardly to form the dome. An annular rim 33 extending circumferentially forms the outer portion of the dome-shaped frame and a relatively small annular ring 34 forms the innermost portion of the frame to which the spokes are attached. The entire exposed portion of the frame on the upper side is covered by a screen 35 of very fine mesh, the mesh being approximately what is termed conventionally as a two hundred mesh screen, there being provided a clearance through the screen at each aperture of approximately .002 inch in breadth. It is important that the wires of the screen be very thin so that although blocking passage of the coffee grounds and fine sediment, it avoids, on the other hand, providing surfaces for the accumulation of very fine sediment and coffee oils.

At the center of the frame there is secured what may be termed a washer 36 spot welded or otherwise attached to the upper side of the annular ring 34 and at the same time serving as a means for holding the central portion of the screen 35 in place. The washer is provided with a central hole or aperture 37.

At the lower end or edge the screen is secured to the rim 33 by a band 38 which is turned in a somewhat U-shape to attach itself on opposite sides of the rim 33 and to provide further a slight bead 39 at the outermost circumference.

A central shaft 40 extends through the hole or aperture 37 in the washer 36 wherein it is adapted to slide with a free-sliding but snug fit. At its upper end the shaft has a right angularly turned portion 41 joined to the main portion of the shaft by a curve 42 of relatively large radius sufficient to permit the shaft to be slid downwardly through the aperture 37 in order to remove the shaft and outwardly bent portion 41 entirely from the frame of the screen.

The shaft 40 extends downwardly so that a lower portion 43 of appreciable length protrudes below the screen structure where at its lowermost extremity 44 there is provided a hook adapted to engage beneath the rim of the neck 18 as shown in Figure 1. A portion 45 at the lower end is bent outwardly so that when the hook 44 engages the rim of the neck the main portion of the shaft is in a vertical position centrally disposed within the neck 18.

For holding the lower end of the shaft there is provided a spider herein illustrated as comprising legs 50 and 51, these legs extending downwardly and being joined at their lowermost ends by means of a yoke 52. At the upper ends the legs form a relatively gentle curved portion 53 extending well upwardly within the concave cavity of the frame and from there turn outwardly and downwardly to a point 54 where the upper extremity of each leg is secured by welding or some other appropriate means to the rim 31. By shaping and fastening the legs 50 and 51 as just described, legs of considerable resiliency are provided which can eventually serve as an accurate centering medium for positioning the screen in the neck of the upper bowl.

A coiled compression spring 55 surrounds the midportion of the shaft 40, the lower end of the spring being adapted to rest upon the upper side of the yoke 52 and the upper end of the spring being confined by means of a collar or springkeeper 56 which itself fits is a suitable groove in the shaft 40.

It should be noted particularly that the yoke 52 has a split 58 extending outwardly from a central aperture 59 therein. The material of the yoke 52 is normally of sufficient strength that even in spite of the presence of the split yoke holds the legs 50 and 51 firmly in place and provides a sufficient keeper for the spring 55.

On occasions where the fine mesh of the screen 35 may become damaged, clogged or torn to the extent of needing replacement, it is possible to replace the screen without it being necessary to replace the entire screen unit. This may be readily accomplished by bending outwardly a tab 60, as illustrated in Figure 5, which outward bending is permitted by the presence of the pre-cut split 58. When the tab is thus bent outwardly, the lower portion 43 of the shaft 40 can be slid out of its contact with the yoke 52 of the spider and the shaft can then be lowered by sliding the curved portion 42 and outwardly bent portion 41 downwardly through the hole 37. A new screen element and spider can then be attached to the shaft by reversal of the operation just described and once the lower end of the shaft is in position in the aperture 59 and the coiled spring 55 properly located, the tab 60 can be bent back until the yoke again assumes the form shown in Figure 4.

In use the outwardly bent portion 41 forms a ready hand hold or finger hold for manipulating the screen unit or device into position. The lower end of the shaft can be readily projected into the neck 18 and the legs 50 and 51 will slide into the curved upper end 23 of the neck and press lightly against the sides of the neck, thereby accurately centering the screen device in the upper bowl. Accurately centered the beaded portion 39 will set squarely and evenly in the bottom of the upper bowl. During this operation the hook 44 can be readily engaged beneath the lower end of the neck 18.

Once in position a quantity 61 of coffee may be placed in the upper bowl, it being assumed that water 62 has already been placed in the lower bowl. Regardless of how the quantity of coffee may be heaped in the upper bowl, when the water on being heated rises to partly fill the upper bowl the coffee will float about in the water. Then when the lower bowl begins to cool and the water in which the coffee has steeped starts to flow through the screen to the lower bowl by reason of the fact that the screen is properly domed, the pressure will be substantially even throughout the domed portion of the screen and the wet coffee grounds will begin to fall toward the center of the upper bowl to a substantially uniform depth.

It may be stated in this connection that one important element in the uniform brewing of coffee is in having the brew or timing cycle accurate. In commercial coffee making at the rate of something like twelve cups to a coffee maker the correct time is somewhere between four and one-half and five minutes. For lighter loads of about nine cups the timing should be slightly less, namely, around three to three and one-half minutes. Unless the wet coffee grounds distribute themselves evenly about the domed portion of the screen, passage of the brew will be impaired by too much thickness of grounds at certain points and the brew will not be consistent. It is important, therefore, not only that the strainer device be centered accurately but also that the shape of the dome be substantially in conformance with the proportions illustrated in Figures 1 and 2.

There has therefore been described a screen device for a vacuum type coffee maker which is particularly effective in producing a uniform brew, the quality of which can be assured because of the construction of the screen device, the device moreover being simple in construction in the interest of sanitation and one readily handled and manipulated when put together to accomplish a brew.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a coffee maker for the vacuum process of making coffee by use of an upper bowl with a downwardly extending neck and a lower bowl, the combination of a strainer device comprising a shaft adapted to extend into the neck having an outwardly bent hook at one end adapted to engage beneath the lower edge of said neck, a dome-shaped frame, a fine mesh screen permanently fastened over the outwardly curved part of the frame, a spider comprising two legs secured at upper ends thereof to opposite sides of the rim of said frame, each said leg extending from the upper end upwardly, inwardly and downwardly in a resilient arc to a transverse yoke at the lowermost end, said legs being adapted to resiliently engage at mid-portions thereof the inside wall of said neck, said yoke having a hole therein receiving a lower portion of said shaft, and the center of said frame having a hole therein receiving an upper portion of said shaft.

2. In a coffee maker for the vacuum process of making coffee by use of an upper bowl with a downwardly extending neck and a lower bowl, the combination of a strainer device comprising a shaft adapted to extend into the neck having an outwardly bent hook at one end adapted to engage beneath the lower edge of said neck, a dome-shaped frame having its center of curvature adapted to be located in the neck at a location less than one-half the distance from the top of the neck, a fine mesh screen permanently fastened over the outwardly curved part of the frame, a spider comprising two resilient legs secured at upper ends thereof to opposite sides of the rim of said frame, each said leg extending from the upper end upwardly, inwardly and downwardly in an arc of progressively diminishing curvature to a transverse yoke at the lowermost end, said legs being adapted at intermediate portions thereof to resiliently engage the inside wall of said neck, said yoke having a hole therein receiving a lower portion of said shaft, and the center of said frame having a hole therein receiving an upper portion of said shaft, and a collar on said shaft adjacent said frame below the rim of said frame and a coiled compression spring between said collar and said transverse yoke.

3. A strainer for a vacuum type coffee maker comprising a frame having a fine mesh screen covering the outer surface thereof and having a hole at the center of the frame, a spider comprising not less than two resiliently yieldable legs secured at upper ends thereof to opposite sides of a rim of the frame, each said leg extending generally downwardly in a curved direction from said upper end, a rigid yoke joining lowermost ends of said legs, said yoke having a central hole therethrough and a split from the hole to the outer edge of the yoke at one side thereof, a shaft extending through said hole having a lower hooked end and having an upper portion extending through the hole in the frame, said upper portion having a form adapted to slide through the hole in the frame, said yoke being temporarily bent open at said split to permit removal of the shaft from the spider and frame.

4. A strainer for a vacuum type coffee maker comprising a dome-shaped frame having a fine mesh screen covering the outer surface thereof and having a hole at the center of the frame, a spider comprising not less than two resiliently yieldable legs secured at upper ends thereof to opposite sides of a rim of the frame, each said leg extending upwardly, inward and downward from said upper end, a rigid yoke joining lowermost ends of said legs, said yoke having a central hole therethrough and a split from the hole to the outer edge of the yoke at one side thereof, a shaft extending through said hole having a lower hooked end and having an upper portion extending through the hole in the frame, said upper portion having a transverse angularly bent hand hold joining the shaft with a curved joint adapted to slide through the hole in the frame, and a collar on the upper portion of said shaft located below the hole in the frame, and a coiled spring on the shaft retained by said collar, said yoke being adapted to be temporarily bent to open the hole therein at said split to permit removal of the shaft from the spider and frame.

5. In a coffee maker for the vacuum process of making coffee by use of an upper bowl with a downwardly extending neck and a lower bowl, the combination of a strainer device comprising a dome-shaped frame having a circumferentially extending screen support member, a relatively flat centrally located screen support member at the apex of the dome-shaped frame, arcuate ribs between the screen support members, said circumferentially extending screen support member having a substantially U shape in cross-section comprising upper and lower flanges, a dome-shaped fine wire mesh screen having its periphery pressed by said flanges in the space therebetween, said screen having the center thereof permanently secured to the centrally located screen support member whereby to anchor the screen to the frame, said last member having an aperture therethrough and means extending slidably downwardly through said aperture adapted to engage the lower end of the neck whereby to secure the strainer device in the upper bowl.

References Cited in the file of this patent
UNITED STATES PATENTS

| | | |
|---|---|---|
| 417,628 | Buob et al. | Dec. 17, 1889 |
| 1,989,034 | Anderson et al. | Jan. 22, 1935 |
| 2,274,607 | Cohen | Feb. 24, 1942 |
| 2,331,705 | Lehmann | Oct. 12, 1943 |
| 2,449,620 | Reichold | Sept. 21, 1948 |